United States Patent [19]
Pell, deceased

[11] 3,766,362
[45] Oct. 16, 1973

[54] AVERAGING APPARATUS

[76] Inventor: Richard A. Pell, deceased, late of Baldwin, Kans. by Elizabeth P. Pell, heir

[22] Filed: Nov. 24, 1972

[21] Appl. No.: 309,452

[52] U.S. Cl. .......... 235/61 E
[51] Int. Cl. .......... G06c 15/00
[58] Field of Search .......... 235/61 E

[56] References Cited

UNITED STATES PATENTS

| | | | |
|---|---|---|---|
| 2,145,347 | 1/1939 | Everitt | 235/61 E X |
| 2,162,767 | 6/1939 | Thurlow | 235/61 E X |

*Primary Examiner*—Richard B. Wilkinson
*Assistant Examiner*—Lawrence R. Franklin
*Attorney*—Norman G. Steanson, Jr.

[57] ABSTRACT

A housing having selectively spaced first indicator opening and second indicator opening is provided. A center disc is rigidly mounted to a first shaft which is reciprocally and rotatably mounted centrally in the housing. An averaging disc and a coupling disc of the same diameter as the center disc are rigidly but separately mounted on a second shaft which is rotatably mounted in the housing. The averaging disc has a peripheral numbers scale on the averaging disc face. Springs on the first shaft bias the center disc reciprocally but normally into engagement with the averaging disc. An elongated disc having a peripheral numbers scale coextensive with the averaging disc numbers scale is rotatably mounted in the housing with the center disc in constant sliding engagement with the elongated disc. A half rate disc with a diameter one half the diameter of the center disc is also rigidly mounted to the first shaft. A pair of intermediate discs are rotatably mounted in the housing and engaged with each other and the coupling disc and adapted to be engagable with the half rate disc when the half rate disc is moved into engagement therewith. So the center disc may be turned to set the first number to be averaged on the averaging disc and elongated disc and then the second number may be set on the elongated disc with the first shaft reciprocated to engage the half rate disc with an intermediate disc so that the averaging disc turns at one half the rate of the elongated disc so that the average of the two numbers may be read on the averaging disc through the first indicator opening.

23 Claims, 4 Drawing Figures

PATENTED OCT 16 1973

3,766,362

SHEET 1 OF 2

AVERAGING APPARATUS

BACKGROUND OF THE INVENTION

This invention relates to a number averaging apparatus wherein a disc is rotated to set a first number to be averaged thereon and then the second number is set into the disc with the disc rotating at one half speed to enable the operator to take the average of the two numbers from the disc.

In the prior art rather complicated devices may be seen for averaging numbers including complicated setting disc scale faces and coacting mechanisms for indicating where on the scale faces the numbers and answers are to be set and read. Slide rule type averaging devices have also been provided.

A problem solved by this invention is to provide a simple and economical averaging apparatus whereby two numbers may be averaged simply and quickly.

Another problem solved by this invention is to provide an averaging apparatus valuable to operators having to routinely average numbers constantly such as lab personnel.

Another problem solved by this invention is to provide an averaging apparatus that is mechanically simple to operate.

SUMMARY OF THE INVENTION

A housing having selectively spaced first indicator opening and second indicator opening is provided. A center disc is rigidly mounted to a first shaft which is reciprocally and rotatably mounted centrally in the housing. An averaging disc and a coupling disc of the same diameter as the center disc are rigidly but separately mounted on a second shaft which is rotatably mounted in the housing. The averaging disc has a peripheral numbers scale on the averaging disc face. Springs on the first shaft bias the center disc reciprocally but normally into engagement with the averaging disc. An elongated disc having a peripheral numbers scale coextensive with the averaging disc numbers scale is rotatably mounted in the housing with the center disc in constant sliding engagement with the elongated disc. A half rate disc with a diameter one half the diameter of the center disc is also rigidly mounted to the first shaft. A pair of intermediate discs are rotatably mounted in the housing and engaged with each other and the coupling disc and adapted to be engagable with the half rate disc when the half rate disc is moved into engagement therewith. So the center disc may be turned to set the first number to be averaged on the averaging disc and elongated disc and then the second number may be set on the elongated disc with the first shaft reciprocated to engage the half rate disc with an intermediate disc so that the averaging disc turns at one half the rate of the elongated disc so that the average of the two numbers may be read on the averaging disc through the first indicator opening.

BRIEF DESCRIPTION OF THE DRAWINGS

Referring to the drawings.

DESCRIPTION OF THE PREFERRED EMBODIMENT

Figure 1:
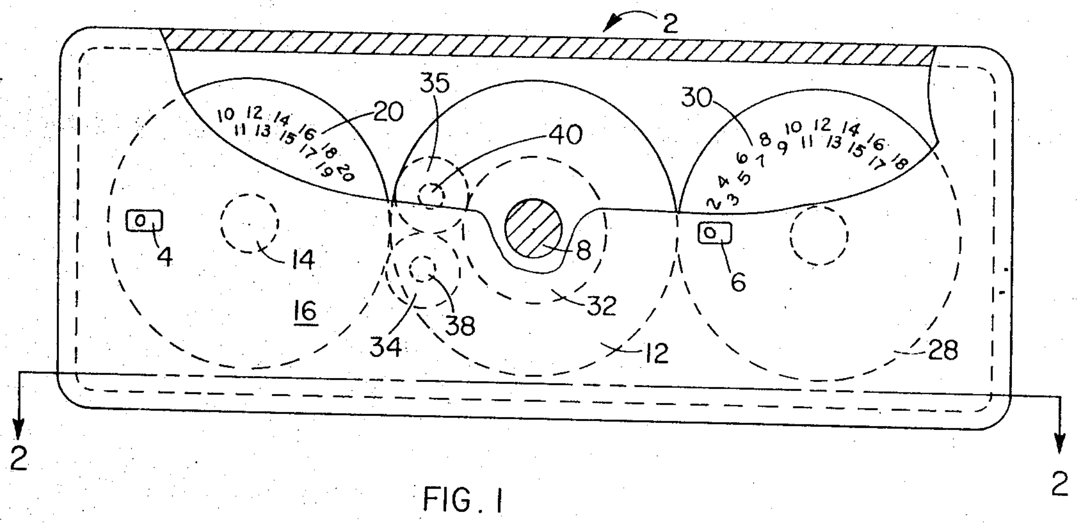
FIG. 1 is a top plan view of the averaging apparatus using discs with the housing top partially cut away.
Figure 2:
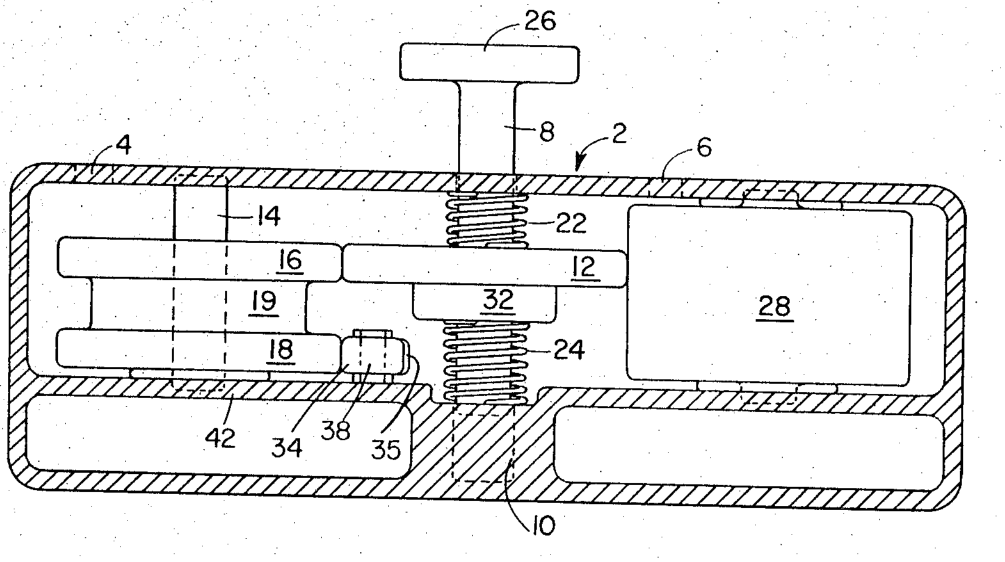
FIG. 2 is a sectional view taken along line 2—2 of FIG. 1.

Referring more in detail to FIG. 1 and FIG. 2, a housing 2 having a first indicator opening 4 and second indicator opening 6 is provided. A first shaft 8 is rotatably and reciprocally mounted in the housing by rotatably and slidably fitting first shaft 8 in cylindrical bore 10. A center disc 12 is rigidly mounted to first shaft 8. A second shaft 14 is rotatably journaled into the housing 2. An averaging disc 16 and a coupling disc 18 of the same diameter as the center disc 12 are rigidly but separately mounted to the second shaft 14. The averaging disc 16 and coupling disc 18 are rigidly coupled together by connecting member 19. The averaging disc 16 has a first peripheral numbers scale 20 on the face thereof that pass underneath the first indicator opening 4. A first spring 22 and second spring 24 are mounted on the first shaft 8 to reciprocally bias the center disc 12 into normal engagement with the averaging disc 16. A knob 26 is mounted to the first shaft 8 for assisting in rotating and reciprocating the first shaft 8. An elongated disc 28 of the same diameter as the center disc 12 is rotatably journaled in the housing 2 and has a second peripheral numbers scale 30 on the face thereof that is coextensive with the first numbers scale 20 on the averaging disc 16 and that passes beneath the second indicator opening 6. The first peripheral numbers scale 20 and second peripheral numbers scale 30 are not completely shown but, of course, extend completely around the periphery of the averaging disc 16 and elongated disc 28, respectively. The center disc 12 is in sliding engagement with the elongated disc 28. A half rate disc 32 of one half the diameter of the center disc 12 is rigidly mounted to the first shaft 8 below the center disc 12. A pair of intermediate discs comprised of a first intermediate disc 34 and second intermediate disc 35 are rotatably mounted on third shaft 38 and fourth shaft 40 respectively which are mounted to the housing bottom 42. The first intermediate disc 34 and second intermediate disc 35 are engaged with each other and the coupling disc 18 and adapted to be engagable with the half rate disc 32 when the first shaft is reciprocated to bring the half rate disc 32 into engagement with the second intermediate disc 35. Two intermediate discs are required to maintain the correct turning directions.

To operate the averaging apparatus, the knob 26 is turned to rotate the center disc 12, which turns both the averaging disc 16 and elongated disc 28, until the first number of be averaged appears underneath both the first indicator opening 4 and second indicator opening 6 which are spaced over the averaging disc 16 and elongated disc 28 to so allow. The first shaft 8 is then reciprocated to disengage the center disc 12 from the averaging disc 16 and engage the half rate disc 32 with the second intermediate disc 35 while maintaining the center disc 12 in engagement with the elongated disc 28. With the first shaft 8 so reciprocated the knob 26 is turned until the second number to be averaged appears underneath the second indicator opening 6 above the second numbers scale 30 on the elongated disc 28. When this is done the average of the numbers will appear under the first indicator opening 4 above the first numbers scale 20 on the averaging disc 16 because the half rate disc 32 only rotated the averaging disc 16 at one half the rate that the center disc 12 rotated the elongated disc 28 while the first shaft 8 is reciprocated. This is true because mathematically the average of two numbers is equal to the first number plus one half the difference between the first number and second number. If the second number is the smaller of course the difference will be a minus number.

To reset the averaging apparatus the procedure is just reversed in that the elongated disc 28 is rotated back to the first number with the first shaft 8 reciprocated and then returned to zero with the first shaft 8 in the normal position.

Thus an averaging apparatus is provided to accomplish the enumerated objects of the invention.

Figure 3:
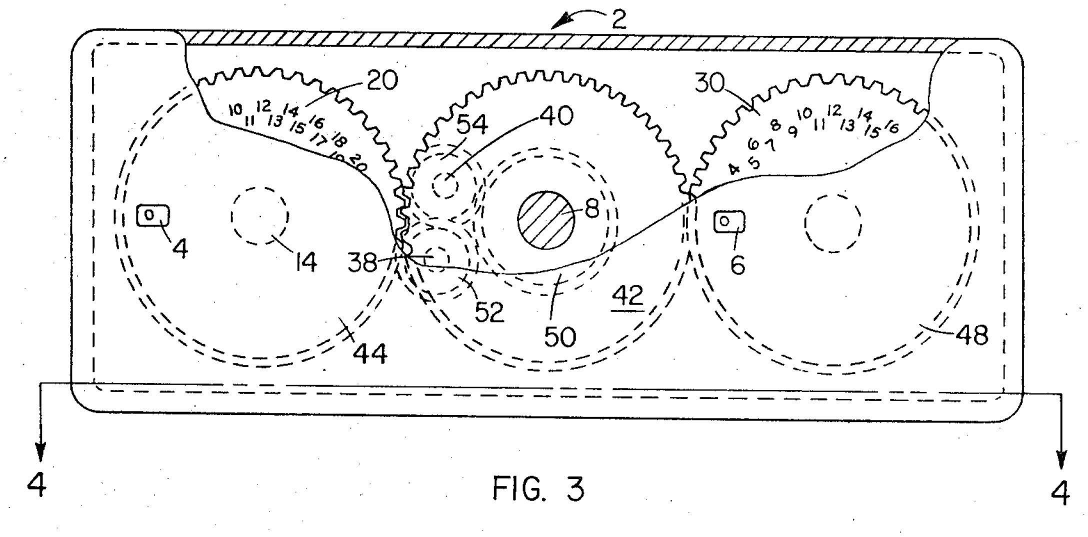
FIG. 3 is a top plan view of the averaging apparatus using gears with the housing top partially cut away.
Figure 4:
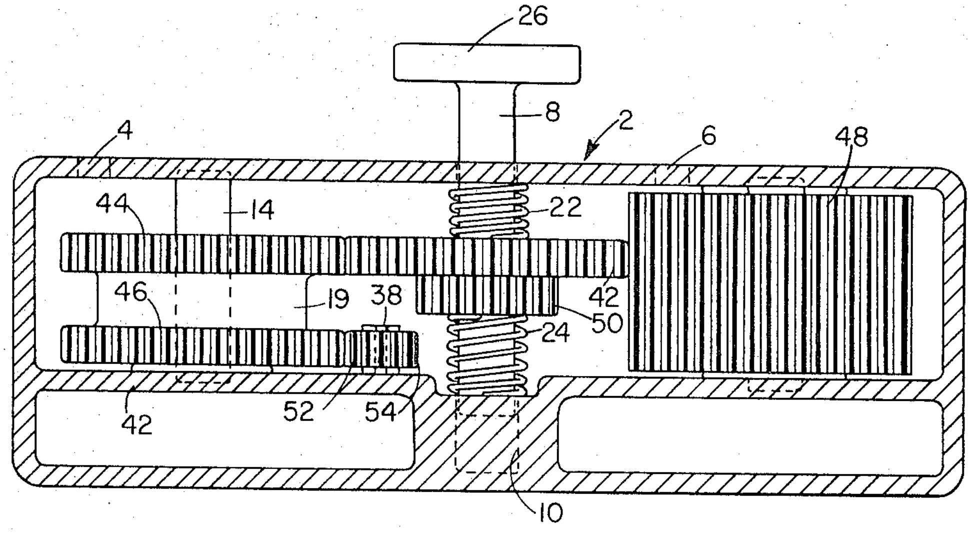
FIG. 4 is a sectional view taken long line 4—4 of FIG. 3.

Referring to FIG. 3 and FIG. 4 the apparatus is exactly the same as shown in FIG. 1 and FIG. 2 and as described above except that the discs are replaced by gears. That is center gear 42 replaces center disc 12, averaging gear 44 replaces averaging disc 16, coupling gear 46 replaces coupling disc 18, elongated gear 48 replaces elongated disc 28, half rate gear 50 replaces half rate disc 32, first intermediate gear 52 replaces first intermediate disc 34 and second intermediate gear 54 replaces second intermediate disc 35.

The discs may be made with rounded edges and somewhat resilient for easier engaging and disengaging the discs.

The invention in its broader aspects is not limited to the specific manufacture shown and described but departure may be made therefrom within the scope of the accompanying claims without sacrificing its chief advantages.

I claim:

1. Apparatus for averaging numbers which comprises:

a. a housing having a selectively spaced first indicator opening and a selectively spaced second indicator opening;

b. a center disc rigidly mounted to a first shaft which is reciprocally and rotatably mounted centrally in the housing;

c. an averaging disc and an elongated disc of the same diameter both rotatably mounted in the housing in engagement with the center disc and both having coextensive peripheral scales of numbers on the faces thereof so that rotating the center disc rotates the averaging disc and elongated disc coextensively;

d. means for selectively rotating the averaging disc at one half the rate of the elongated disc so that when the first number to be averaged is set on the averaging disc and the elongated disc and the second number to be averaged is set on the elongated disc while rotating the averaging disc at one half the rate of the elongated disc the average of the two numbers may be taken from the averaging disc.

2. Apparatus for averaging numbers which comprises:

a. a housing having a selectively spaced first indicator opening and selectively spaced second indicator opening;

b. a center disc rigidly mounted to a first shaft which is reciprocally and rotatably mounted in the housing;

c. an averaging disc and a coupling disc rigidly but separately coupled on a second shaft rotatably mounted in the housing with the averaging disc and coupling disc having the same diameter as the center disc and the averaging disc having a peripheral numbers scale and normally in engagement with the center disc;

d. an elongated disc of the same diameter as the center disc rotatably mounted in the housing and having a peripheral numbers scale coextensive with the averaging disc peripheral numbers scale and with the center disc in sliding engagement with the elongated disc;

e. a half rate disc having a diameter one half the diameter of the center disc mounted to the first shaft;

f. a pair of intermediate discs rotatably mounted in the housing and engaged with each other and the coupling disc and engagable with the half rate disc when the first shaft is selectively reciprocated so that the first number to be averaged may be set on the averaging disc and the elongated disc with the center disc and then the second number may be set on the elongated disc with the first shaft selectively reciprocated to engage the half rate disc with an intermediate disc so that the average of the two numbers may be taken from the averaging disc.

3. Apparatus for averaging numbers as recited in claim 1 further comprising:

a spring means for reciprocally biasing the center disc into normal engagement with the averaging disc disposed in the housing.

4. Apparatus for averaging numbers as recited in claim 2 further comprising:

a. spring means for reciprocally biasing the center disc into normal engagement with the averaging disc disposed in the housing.

5. Apparatus for averaging numbers as recited in claim 1 further comprising:

a. a knob mounted to the first shaft for reciprocating and rotating the first shaft.

6. Apparatus for averaging numbers as recited in claim 2 further comprising:

a. a knob mounted to the first shaft for reciprocating and rotating the first shaft.

7. Apparatus for averaging numbers as recited in claim 1 further comprising:

a. spring means for reciprocally biasing the center disc into normal engagement with the averaging disc disposed in the housing;

b. a knob mounted to the first shaft for reciprocating and rotating the first shaft.

8. Apparatus for averaging numbers as recited in claim 2 further comprising:

a. spring means for reciprocally basing the center disc into normal engagement with the averaging disc disposed in the housing;

b. a knob mounted to the first shaft for reciprocating and rotating the first shaft.

9. Apparatus for averaging numbers which comprises:

a. a housing having a selectively spaced first indicator opening and a selectively spaced second indicator opening;

b. a center gear rigidly mounted to a first shaft which is reciprocally and rotatably mounted centrally in the housing;

c. an averaging gear and an elongated gear of the same diameter both rotatably mounted in the housing in engagement with the center gear and both having coextensive peripheral scales of numbers on the faces thereof so that rotating the center gear rotates the averaging gear and elongated gear coextensively;

d. means for selectively rotating the averaging gear at one half the rate of the elongated gear so that when the first number to be averaged is set on the averaging gear and the elongated gear and the second number to be averaged is set on the elongated gear while rotating the averaging gear at one half the rate of the elongated gear the average of the two numbers may be taken from the averaging gear.

10. Apparatus for averaging numbers which comprises:

a. a housing having a selectively spaced first indicator opening and selectively spaced second indicator opening;

b. a center gear rigidly mounted to a first shaft which is reciprocally and rotatably mounted in the housing;

c. an averaging gear and a coupling gear rigidly but separately coupled on a second shaft rotatably mounted in the housing with the averaging gear and coupling gear having the same diameter as the center gear and the averaging gear having a peripheral numbers scale and normally in engagement with the center gear;

d. an elongated gear of the same diameter as the center gear rotatably mounted in the housing and having a peripheral numbers scale coextensive with the averaging gear peripheral numbers scale and with the center gear in sliding engagement with the elongated gear;

e. a half rate gear having a diameter one half the diameter of the center gear mounted to the first shaft;

f. a pair of intermediate gears rotatably mounted in the housing and engaged with each other and the coupling gear and engagable with the half rate gear when the first shaft is selectively reciprocated so that the first number to be averaged may be set on the averaging gear and the elongated gear with the center gear and then the second number may be set on the elongated gear with the first shaft selectively reciprocated to engage the half rate gear with an intermediate gear so that the average of the two numbers may be taken from the averaging gear.

11. Apparatus for averaging numbers as recited in claim 9 further comprising:

a. spring means for reciprocally biasing the center gear into normal engagement with the averaging gear disposed in the housing.

12. Apparatus for averaging numbers as recited in claim 10 further comprising:

a. spring means for reciprocally biasing the center gear into normal engagement with the averaging gear disposed in the housing.

13. Apparatus for averaging numbers as recited in claim 9 further comprising:

a. a knob mounted to the first shaft for reciprocating and rotating the first shaft.

14. Apparatus for averaging numbers as recited in claim 10 further comprising:

a. a knob mounted to the first shaft for reciprocating and rotating the first shaft.

15. Apparatus for averaging numbers as recited in claim 9 further comprising:

a. spring means for reciprocally biasing the center gear into normal engagement with the averaging gear disposed in the housing;

b. a knob mounted to the first shaft for reciprocating and rotating the first shaft.

16. Apparatus for averaging numbers as recited in claim 10 further comprising:

a. spring means for reciprocally biasing the center gear into normal engagement with the averaging gear disposed in the housing;

b. a knob mounted to the first shaft for reciprocating and rotating the first shaft.

17. An averaging apparatus comprising:

input means for entering a first and second number into said apparatus;

a first indicator having indicia for displaying each number entered by said input means;

means responsive to said input means for setting said first indicator to display said each number;

a second indicator having indicia for displaying the average of the numbers entered by said input means;

first means selectively responsive to said input means for entering said first number into said second indicator, said second indicator indicia displaying said first number;

and second means selectively responsive to said input means and actuated while setting said second number into said first indicator for algebraically adding one-half the difference of said first and second numbers to said first number displayed by said second indicator indicia thereby forming the average of said first and second numbers, said second number being displayed by said first indicator indicia and said average being displayed by said second indicator indicia.

18. An averaging apparatus as in claim 17 wherein said input means comprises a rotatable input shaft; said first indicator comprises an indicator disc;

said setting means comprises a first transmission means having a first gear ratio, said first transmission means interconnecting said input shaft and said indicator disc;

said second indicator comprises an averaging disc;

said first means comprises a second transmission means hving a gear ratio equal to said first gear ratio, said second transmission means interconnecting said input shaft and said averaging disc;

and said second means comprises a third transmission means having a second gear ratio different from said first gear ratio, said third transmission means interconnecting said input shaft and said averaging disc.

19. An averaging apparatus as in claim 18 wherein said second gear ratio is twice said first gear ratio.

20. An averaging apparatus as in claim 19 wherein said input means further comprises means for selectively connecting said input shaft to said second transmission means or said third transmission means.

21. An averaging apparauts as in claim 20 wherein said apparatus is enclosed in a housing, said housing having index means for indicating the number displayed on said indicators;

said input shaft further comprises first and second input discs secured thereto, said first input disc being constantly in engagement with said first transmission means;

and said selectively connected means comprises said input shaft being journaled in said housing for reciprocable movement, said first input disc being normally biased by spring means into engagement with said second transmission means and being axially shiftable against said spring means out of engagement with said second transmission means, and said second input disc being normally biased out of engagement with said third transmission means and being axially shiftable into engagement with said third transmission means.

22. An averaging apparatus as in claim 21 wherein said input shaft has one end extending through said housing and has a manually rotatable knob secured to said one end.

23. An averaging apparatus as in claim 21 wherein said index means comprises apertures in said housing through which said indicia may be viewed.

* * * * *